(12) United States Patent
Albus et al.

(10) Patent No.: US 8,724,201 B2
(45) Date of Patent: May 13, 2014

(54) MEMS ACTUATOR AND MEMS ACTUATED SHUTTER MECHANISM

(76) Inventors: Brian Albus, Plymouth, MI (US); Edward Tang, Ann Arbor, MI (US)

( * ) Notice: Subject to any disclaimer, the term of this patent is extended or adjusted under 35 U.S.C. 154(b) by 341 days.

(21) Appl. No.: 13/187,185

(22) Filed: Jul. 20, 2011

(65) Prior Publication Data

US 2013/0021656 A1  Jan. 24, 2013

(51) Int. Cl.
G02B 26/02  (2006.01)

(52) U.S. Cl.
USPC .......................... 359/230; 359/234

(58) Field of Classification Search
USPC ............... 359/230, 227, 234; 396/194, 471, 396/479–480
See application file for complete search history.

(56) References Cited

U.S. PATENT DOCUMENTS

| | | | |
|---|---|---|---|
| 4,157,870 A * | 6/1979 | Roberts | 355/121 |
| 6,275,320 B1 | 8/2001 | Dhuler et al. | |
| 6,404,969 B1 * | 6/2002 | Tayebati et al. | 385/140 |
| 6,428,173 B1 * | 8/2002 | Dhuler et al. | 359/872 |
| 6,441,360 B1 | 8/2002 | Bishop et al. | |
| 6,535,311 B1 | 3/2003 | Lindquist | |
| 6,591,032 B2 * | 7/2003 | Tayebati et al. | 385/18 |
| 6,618,184 B2 * | 9/2003 | Jin et al. | 359/291 |
| 6,750,999 B1 * | 6/2004 | Chiao | 359/237 |
| 6,775,048 B1 | 8/2004 | Starkweather et al. | |
| 6,914,635 B2 | 7/2005 | Ostergard | |
| 6,958,850 B2 * | 10/2005 | Sane et al. | 359/298 |
| 7,477,842 B2 | 1/2009 | Gutierrez | |
| 7,656,568 B2 * | 2/2010 | Choo et al. | 359/199.1 |
| 7,832,948 B1 | 11/2010 | Gutierrez | |
| 7,864,404 B2 | 1/2011 | Cho et al. | |
| 2004/0136074 A1 * | 7/2004 | Ford et al. | 359/572 |
| 2004/0184130 A1 * | 9/2004 | Kormos et al. | 359/234 |
| 2004/0233498 A1 * | 11/2004 | Starkweather et al. | 359/230 |
| 2008/0123171 A1 * | 5/2008 | Dausch et al. | 359/230 |
| 2010/0271686 A1 | 10/2010 | Powers et al. | |
| 2011/0069369 A1 | 3/2011 | Park et al. | |

* cited by examiner

Primary Examiner — Frank Font
(74) Attorney, Agent, or Firm — Jeffrey Schox

(57) ABSTRACT

The present application generally describes several microelectromechanical systems (MEMS) including apparatuses, devices and systems configured for actuating a microdevice such as a shutter for use in a mobile terminal camera. One preferred embodiment described herein can include an apparatus including a curtain substantially disposed in a plane; an actuator mechanically connected to the curtain; and a voltage supply electrically connected to the actuator such that in response to a predetermined voltage the actuator thermally expands and thereby causes displacement of the curtain within the plane.

43 Claims, 4 Drawing Sheets

MEMS ACTUATOR AND MEMS ACTUATED SHUTTER MECHANISM

BACKGROUND AND SUMMARY

The present invention relates generally to microelectromechanical systems (MEMS) and more specifically to apparatuses, devices and systems configured for actuating a microdevice such as a shutter for use in a mobile terminal camera.

A first preferred embodiment can include an apparatus including a curtain substantially disposed in a plane; an actuator mechanically connected to the curtain; and a voltage supply electrically connected to the actuator such that in response to a predetermined voltage the actuator thermally expands and thereby causes displacement of the curtain within the plane.

A second preferred embodiment can include a shutter device including a first pair of MEMS thermal actuators mechanically connected to a first curtain; a second pair of MEMS thermal actuators mechanically connected to a second curtain; and a voltage supply electrically connected to the first and second pairs of MEMS thermal actuators such that in response to a predetermined voltage, the first and second pairs of MEMS thermal actuators expand to cause translation of the first and second curtains.

A third preferred embodiment can include an actuator system including a first dual force perpendicular spring having a first pair of MEMS thermal actuators connected to a first curtain; a second dual force perpendicular spring having a second pair of MEMS thermal actuators connected to a second curtain; and a controller adapted to cause actuation of the first and second dual force perpendicular springs in response to a user input.

Other aspects and features of the present invention are described in detail with reference to the following drawings.

DETAILED DESCRIPTION OF THE PREFERRED EMBODIMENTS

As will be appreciated by one skilled in the art, aspects of the present invention may be embodied as an apparatus, system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "controller," "circuit," "module" or "system." Furthermore, aspects of the present invention may take the form of a computer program product embodied in one or more computer readable medium(s) having computer readable program code embodied thereon.

As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

1. PREFERRED EMBODIMENTS

Figure 1:
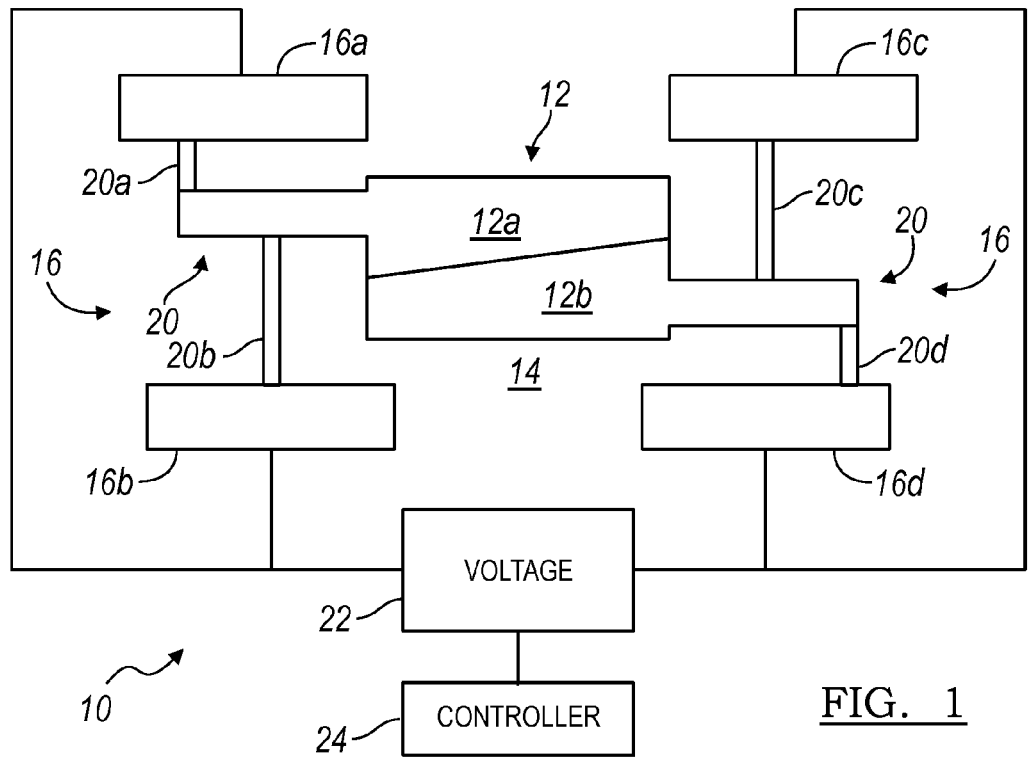
FIG. 1 is a schematic block diagram of a system or apparatus according to a preferred embodiment of the present invention and variations thereof.

As shown in FIG. 1, an apparatus 10 according to a first preferred embodiment can include a curtain 12 substantially disposed in a plane 14. The curtain 12 of the apparatus 10 of the first preferred embodiment can function as a selectively movable blockade or occlusion configured for partially or entirely obscuring or preventing passage of one or more elements, such as for example light. The plane 14 of the apparatus 10 of the first preferred embodiment can function at least in part as a focal plane for light or any other element for which selective passage is sought. In one particular variation of the apparatus 10 of the first preferred embodiment described herein, the curtain 12 can be configured as a shutter adapted to selectively open and close to permit or prohibit light from passing through a focal plane 14 of a camera. In one alternative, the apparatus 10 of the preferred embodiment can be disposed in or along a optical path, including for example in or near a focal plane of an optical apparatus such as a still frame camera or video camera.

The apparatus 10 of the first preferred embodiment can further include an actuator 16 mechanically connected to the curtain 12. The actuator 16 of the apparatus 10 of the first preferred embodiment functions to direct a force at or to the curtain 12 so as to cause movement of the curtain 12 substantially within the plane 14. In variations of the apparatus 10 of the first preferred embodiment, the actuator 16 can be activated by electrical, electromagnetic, mechanical, optical, piezoelectric, and/or thermal inputs or any suitable combination thereof.

The apparatus 10 of the first preferred embodiment can include a voltage supply 22 electrically connected to the actuator 16. The voltage supply 22 functions to provide a predetermined voltage to the actuator 16, such that in response to a predetermined voltage the actuator 16 thermally expands and thereby causes displacement of the curtain 12 within the plane 14. In a first variation of the apparatus 10 of the first preferred embodiment, the predetermined voltage can range between zero and ten volts. Alternatively, the predetermined voltage can be approximately five volts, or some other suitable voltage usable in handheld mobile terminals and/or cameras. In another variation of the apparatus 10 of the first preferred embodiment, the voltage supply 22 can include a mobile terminal battery or power source. As an example, the apparatus 10 of the first preferred embodiment can be configured within a mobile camera or a camera portion of a mobile terminal such as a mobile phone.

In another variation of the apparatus 10 of the first preferred embodiment, the curtain 12 can include a first curtain 12a and a second curtain 12b arranged in a substantially coplanar fashion. As shown in FIG. 1, the first and second curtains 12a, 12b can be arranged such that they are substantially coplanar with the plane 14. As noted above, the plane 14 of the apparatus 10 of the first preferred embodiment can function at least in part as a focal plane for light or any other element for which selective passage is sought. The plane 14 can be disposed in or along an optical path, and can include all or part of a focal plane. In one particular variation of the apparatus 10 of the first preferred embodiment described herein, the first curtain 12a and second curtain 12b can be configured as a focal plane shutter of the type usable in a mobile camera. In another variation of the apparatus 10 of the first preferred embodiment, the first curtain 12a and the second curtain 12b can be actuated by any suitable combination of thermal actuators, electrostatic actuators, magnetic actuators, piezoelectric actuators and the like.

In another variation of the apparatus 10 of the first preferred embodiment, the actuator 16 can include a first actuator 16a, 16b and a second actuator 16c, 16d. As shown in FIG. 1, the first actuator 16a, 16b can be mechanically connected to the first curtain 12a and the second actuator 16c, 16d can be mechanically connected to the second curtain 12b. The mechanical connections between the first and second actuators 16a, 16b, 16c, 16d and the first and second curtains 12a, 12b function to transmit a force from the first and second actuators 16a, 16b, 16c, 16d to the first and second curtains 12a, 12b, respectively. The first and second actuators 16a, 16b, 16c, 16d can be configured as any suitable combination of thermal actuators, electrostatic actuators, magnetic actuators, piezoelectric actuators, optical actuators and the like.

In a first alternative variation of the apparatus 10 of the first preferred embodiment, the first actuator 16a, 16b can include a first MEMS thermal actuator 16a and a second MEMS thermal actuator 16b. The apparatus 10 of the first alternative variation of the first preferred embodiment can also include a first beam 20a connecting the first MEMS thermal actuator 16a and the first curtain 12a and a second beam 20b connecting the second MEMS thermal actuator 16b and the first curtain 12a. As shown in FIG. 1, the apparatus 10 of the first alternative variation of the first preferred embodiment can be configured such that the first MEMS thermal actuator 16a is arranged opposite the second MEMS thermal actuator 16b relative to the first curtain 12a such that actuation of the first actuator 16a, 16b causes rotational displacement of the first curtain 12a in the plane 14.

Figure 2:
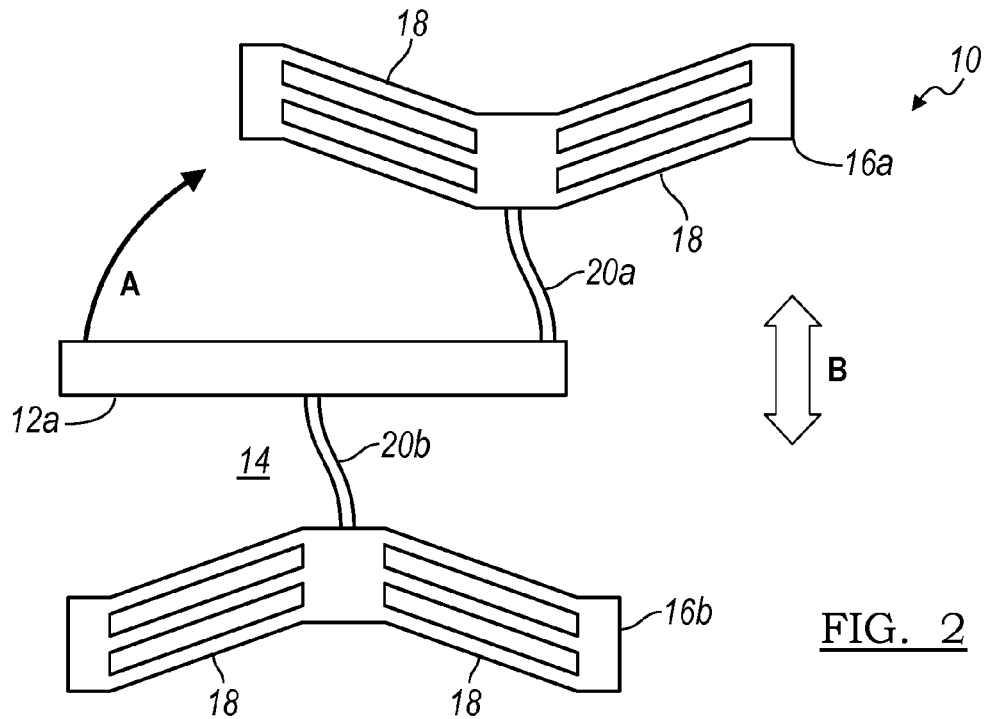
FIG. 2 is a schematic block diagram of a system or apparatus according to another preferred embodiment of the present invention and variations thereof.

In a second alternative variation of the apparatus 10 of the first preferred embodiment, the first and second MEMS thermal actuators 16a, 16b can be configured as chevron bent beams adapted for thermal expansion/actuation in response to the predetermined voltage. As shown in FIG. 2, the first and second MEMS thermal actuators 16a, 16b can include one or more beams 18 configured in a non-linear or chevron shape such that expansion of the beams 18 can cause linear displacement (substantially parallel to arrow B) of the beams 20a, 20b. In such a manner, the first and second MEMS thermal actuators 16a, 16b can function as a dual force perpendicular spring, thereby causing movement of the first curtain 12a in the plane. As shown, in a dual force perpendicular spring configuration, the movement of the first curtain 12a can be rotational in nature in the direction of arrow A.

In a third alternative variation of the apparatus 10 of the first preferred embodiment, the second actuator 16c, 16d can include a third MEMS thermal actuator 16c and a fourth MEMS thermal actuator 16d. The apparatus 10 of the third alternative variation of the first preferred embodiment can also include a third beam 20c connecting the third MEMS thermal actuator 16c and the second curtain 12b and a fourth beam god connecting the fourth MEMS thermal actuator 16d and the second curtain 12b. As shown in FIG. 1, the apparatus 10 of the third alternative variation of the first preferred embodiment can be configured such that the third MEMS thermal actuator 16c is arranged opposite the fourth MEMS thermal actuator 16d relative to the second curtain 12b such that actuation of the second actuator 16c, 16d causes rotational displacement of the second curtain 12b in the plane 14.

In a fourth alternative variation of the apparatus 10 of the first preferred embodiment, the third and fourth MEMS thermal actuators 16c, 16d can be configured as chevron bent beams adapted for thermal expansion/actuation in response to the predetermined voltage. The third and fourth MEMS thermal actuators 16c, 16d, which can include one or more beams 18 of the type shown in FIG. 2, can be configured in a dual force perpendicular spring configuration as shown in FIG. 2 and described in detail above. Accordingly, thermal expansion of the beams 18 of the third and fourth MEMS thermal actuators 16c, 16d can cause linear displacement (substantially parallel to arrow B) of the beams 20c, 20d, thereby causing movement of the second curtain 12b in the plane. As shown and described above, in a dual force perpendicular spring configuration, the movement of the second curtain 12b can be rotational in nature in a direction opposite of arrow A shown in FIG. 2, such that the first and second curtains 12a, 12b rotate/counter-rotate relative to each other upon actuation.

As shown in FIG. 1, another variation of the apparatus 10 of the first preferred embodiment can include a controller 24 connected to the voltage supply 22 and configured to cause a voltage to be applied to at least one of the first actuator 16a, 16b or the second actuator 16c, 16d. The controller 24 can be configured as a microprocessor, microcomputer, integrated circuit, firmware, software, hardware and/or any suitable combination thereof adapted to perform specified functions. As shown in FIG. 1, the controller 24 can function to cause and/or direct a voltage to be applied by the voltage supply 22 to one or both of the first and second actuators 16a, 16b, 16c, 16d. The controller 24 can be configured as a separate module apart from the voltage supply 22 or as an integral component thereof. Alternatively, the controller 24 can be configured as two or more discrete components cooperatively linked in two or more components of the apparatus 10 of the preferred embodiment and variations thereof.

In another variation of the apparatus 10 of the first preferred embodiment, the controller 24 can be configured to cause a voltage to be applied to the first and second actuators 16a, 16b, 16c, 16d substantially simultaneously, such that actuation and movement of the first and second curtains 12a, 12b is also substantially simultaneous. Alternatively, the controller 24 can be configured to cause a voltage to be applied to the first and second actuators 16a, 16b, 16c, 16d substantially sequentially, such that actuation and movement of the first and second curtains 12a, 12b occurs in a substantially sequential manner. In another alternative, the controller 24 can be configured to cause a voltage to be applied to the first and second actuators 16a, 16b, 16c, 16d in a substantially staggered fashion, such that actuation and movement of the first and second curtains 12a, 12b occurs one-after-the-other. The timing of the actuation of the first and second curtains 12a, 12b can be fixed by or in the controller 24. Alternatively, the timing of the actuation of the first and second curtains 12a, 12b can be variable and subject to change in response to one or more of predetermined control parameters (e.g., lighting conditions); user input such as a picture request, focal change, lighting change, zoom and/or aspect ratio change; and/or internal mobile terminal conditions such as available power, available memory, photodetector/sensor function and the like. In yet another alternative, the controller 24 can be configured to actuate the first and second curtains 12a, 12b at a predetermined frequency, such as for example between 10 and 400 Hz or any other suitable frequency for video imaging. In another alternative, the controller 24 can be configured to actuate the first and second curtains 12a, 12b at a predetermined frequency of approximately 300 Hz. Accordingly, the controller 24 of the apparatus 10 of the first preferred embodiment can be configured as at least one of a mobile terminal camera control module or a macro camera control module, which can function to control some or all aspects of a still and/or video camera, such as for example a mobile terminal camera.

As shown in FIGS. 1 and 2, an apparatus 10 of a second preferred embodiment can include a first pair of MEMS thermal actuators 16a, 16b mechanically connected to a first curtain 12a and a second pair of MEMS thermal actuators 16c, 16d mechanically connected to a second curtain 12b. The MEMS thermal actuators 16a, 16b, 16c, 16d of the apparatus 10 of the second preferred embodiment can function to direct a force at or to the curtain 12a, 12b so as to cause movement of the curtain 12a, 12b substantially within the plane 14. In variations of the apparatus 10 of the second preferred embodiment, the MEMS thermal actuators 16a, 16b, 16c, 16d can be activated by electrical, electromagnetic, mechanical, optical, and/or thermal inputs or any suitable combination thereof.

The apparatus 10 of the second preferred embodiment can also include a voltage supply 22 electrically connected to the first and second pairs of MEMS thermal actuators 16a, 16b, 16c, 16d. The voltage supply 22 of the apparatus 10 of the second preferred embodiment functions to provide a predetermined voltage to the MEMS thermal actuators 16a, 16b, 16c, 16d, such that in response to a predetermined voltage the MEMS thermal actuators 16a, 16b, 16c, 16d thermally expand and thereby causes displacement of the curtains 12a, 12b within the plane 14. In a first variation of the apparatus 10 of the second preferred embodiment, the predetermined voltage can range between zero and ten volts. Alternatively, the predetermined voltage can be approximately five volts, or some other suitable voltage usable in handheld mobile terminals and/or cameras. In another variation of the apparatus 10 of the second preferred embodiment, the voltage supply 22 can include a mobile terminal battery or power source. As an example, the apparatus 10 of the second preferred embodiment can be configured within a mobile camera or a camera portion of a mobile terminal such as a mobile phone.

In a first variation of the apparatus 10 of the second preferred embodiment, the first pair of MEMS thermal actuators 16a, 16b can be configured as chevron bent beams adapted for thermal expansion/actuation in response to the predetermined voltage. As shown in FIG. 2, the pair of MEMS thermal actuators 16a, 16b of the first variation of the apparatus 10 of the second preferred embodiment can include one or more beams 18 configured in a non-linear or chevron shape such that expansion of the beams 18 can cause linear displacement (substantially parallel to arrow B) of the beams 20a, 20b. In such a manner, the first pair of MEMS thermal actuators 16a, 16b can function as a dual force perpendicular spring, thereby causing movement of the first curtain 12a in the plane. As shown, in a dual force perpendicular spring configuration, the movement of the first curtain 12a can be rotational in nature in the direction of arrow A.

In a second variation of the apparatus 10 of the second preferred embodiment, the second pair of MEMS thermal actuators 16c, 16d can be configured as chevron bent beams adapted for thermal expansion/actuation in response to the predetermined voltage. The second pair of MEMS thermal actuators 16c, 16d of the second variation of the apparatus 10 of the second preferred embodiment can include one or more beams 18 of the type shown in FIG. 2, and can be configured in a dual force perpendicular spring configuration as shown in FIG. 2 and described in detail above. Accordingly, thermal expansion of the beams 18 of the third and fourth MEMS thermal actuators 16c, 16d can cause linear displacement (substantially parallel to arrow B) of the beams 20c, 20d, thereby causing movement of the second curtain 12b in the plane. As shown and described above, in a dual force perpendicular spring configuration, the movement of the second curtain 12b can be rotational in nature in a direction opposite of arrow A shown in FIG. 2, such that the first and second curtains 12a, 12b rotate/counter-rotate relative to each other upon actuation.

As shown in FIG. 1, a third variation of the apparatus 10 of the second preferred embodiment can include a controller 24 connected to the voltage supply 22 and configured to cause a voltage to be applied to at least one of the first pair of MEMS thermal actuators 16a, 16b or the second pair of MEMS thermal actuators 16c, 16d. The controller 24 can be configured as a microprocessor, microcomputer, integrated circuit, firmware, software, hardware and/or any suitable combination thereof adapted to perform specified functions. As shown in FIG. 1, the controller 24 can function to cause and/or direct a voltage to be applied by the voltage supply 22 to one or both of the first and second pairs of MEMS thermal actuators 16a, 16b, 16c, 16d. The controller 24 can be configured as a separate module apart from the voltage supply 22 or as an integral component thereof. Alternatively, the controller 24 can be configured as two or more discrete components cooperatively linked in two or more components of the apparatus 10 of the preferred embodiment and variations thereof.

In a fourth variation of the apparatus 10 of the second preferred embodiment, the controller 24 can be configured to cause a voltage to be applied to the first and second pairs of MEMS thermal actuators 16a, 16b, 16c, 16d substantially simultaneously, such that actuation and movement of the first and second curtains 12a, 12b is also substantially simultaneous. Alternatively, the controller 24 can be configured to cause a voltage to be applied to the first and second pairs of MEMS thermal actuators 16a, 16b, 16c, 16d substantially sequentially, such that actuation and movement of the first and second curtains 12a, 12b occurs in a substantially sequential manner. In another alternative, the controller 24 can be configured to cause a voltage to be applied to the first and second pairs of MEMS thermal actuators 16a, 16b, 16c, 16d in a substantially staggered fashion, such that actuation and movement of the first and second curtains 12a, 12b occurs one-after-the-other. The timing of the actuation of the first and second curtains 12a, 12b can be fixed by or in the controller 24. Alternatively, the timing of the actuation of the first and second curtains 12a, 12b can be variable and subject to change in response to one or more of predetermined control parameters (e.g., lighting conditions); user input such as a picture request, focal change, lighting change, zoom and/or aspect ratio change; and/or internal mobile terminal conditions such as available power, available memory, photodetector/sensor function and the like. In yet another alternative, the controller 24 can be configured to actuate the first and second curtains 12a, 12b at a predetermined frequency, such as for example between 10 and 400 Hz or any other suitable frequency for video imaging. In another alternative, the controller 24 can be configured to actuate the first and second curtains 12a, 12b at a predetermined frequency of approximately 300 Hz. As such, the controller 24 of the apparatus 10 of the second preferred embodiment can be configured as at least one of a mobile terminal camera control module or a macro camera control module, which can function to control some or all aspects of a still and/or video camera, such as for example a mobile terminal camera.

Referring again to FIGS. 1 and 2, an apparatus 10 of a third preferred embodiment can include a first dual force perpendicular spring including a first pair of MEMS thermal actuators 16a, 16b connected to a first curtain 12a and a second dual force perpendicular spring including a second pair of MEMS thermal actuators 16c, 16d connected to a second curtain 12b. The MEMS thermal actuators 16a, 16b, 16c, 16d of the apparatus 10 of the third preferred embodiment can function to direct a force at or to the curtain 12a, 12b so as to cause movement of the curtain 12a, 12b substantially within the plane 14. In variations of the apparatus 10 of the preferred embodiment, the MEMS thermal actuators 16a, 16b, 16c, 16d can be activated by electrical, electromagnetic, mechanical, optical, and/or thermal inputs or any suitable combination thereof.

The apparatus 10 of the third preferred embodiment can also include a controller 24 adapted to cause actuation of the first and second dual force perpendicular springs in response to a user input. The controller 24 of the apparatus 10 of the third preferred embodiment can be configured as a microprocessor, microcomputer, integrated circuit, firmware, software, hardware and/or any suitable combination thereof adapted to perform specified functions.

In a first variation of the apparatus 10 of the third preferred embodiment, the controller 24 can function to cause and/or direct a voltage to be applied by a voltage supply 22 to one or both of the first and second pairs of MEMS thermal actuators 16a, 16b, 16c, 16d in response to the user input. As noted above, the controller 24 of the first variation of the apparatus 10 of the third preferred embodiment can be configured as a separate module apart from the voltage supply 22 or as an integral component thereof. Alternatively, the controller 24 can be configured as two or more discrete components cooperatively linked in two or more components of the apparatus 10 of the preferred embodiments and variations thereof.

In a second variation of the apparatus 10 of the third preferred embodiment, the first and second curtains 12a, 12b can be configured to obscure a camera aperture absent the user input, which can include for example a picture request, focal change, lighting change, zoom and/or aspect ratio change; and/or internal mobile terminal conditions such as available power, available memory, photodetector/sensor function and the like. Alternatively, the user input can include a picture request, communicated for example through a user interface of a mobile terminal camera, in response to which the controller 24 can cause the opening of the curtains 12a, 12b through actuation of the first and second dual force perpendicular springs. As such, the controller 24 of the apparatus 10 of the third preferred embodiment can be configured as a mobile terminal camera control module or a macro camera control module, which can function to control some or all aspects of a still and/or video camera, such as for example a mobile phone camera.

2. EXAMPLE EMBODIMENTS

Aspects and features of the preferred embodiments and variations thereof can be embodied in a camera shutter system for a small scale camera, such as a camera of the type used in a mobile phone or other mobile terminal. Other suitable applications can include, but are not limited to, optical or electrical switches, relays, variable capacitors, micropositioners, tunable optical filters and optical mirrors.

A shutter system of the example embodiment can include a first pair of MEMS thermal actuators mechanically connected to a first curtain; a second pair of MEMS thermal actuators mechanically connected to a second curtain; a voltage supply electrically connected to the first and second pairs of MEMS thermal actuators such that in response to a predetermined voltage, the first and second pairs of MEMS thermal actuators expand to cause translation of the first and second curtains. As shown in FIGS. 1 and 2, the first and second pairs of MEMS thermal actuators can be chevron bent beams 18 arranged as a dual force perpendicular spring relative to the first curtain.

As shown in FIG. 2, the beams 18 can be connected in parallel to a center beam in order to stiffen the midpoint of the MEMS thermal actuator 16 and to ensure that any thermal displacement is transmitted in a desired direction, i.e., along arrow B shown in FIG. 2. In the example embodiment, the shutter system was configured in the interest of maximizing displacement, which yielded a bending angle of the beams 18 of five degrees. Each beam was approximately five micrometers wide, one hundred micrometers thick, and four hundred micrometers long with a resistance of ten Ohms. Alternatively, the beam dimensions can be within a suitable range or ratio, such as for example approximately a 200:1 ratio of length to width. In the chevron beam of the example embodiment, an input of approximately five volts leads to two and one half Watts of power dissipation and a center beam (linear) displacement of approximately three micrometers (i.e., along the length of arrow B shown in FIG. 2).

Referring again to FIG. 2, in the dual force perpendicular spring configuration described herein, the beams 20a, 20b can function as transmit springs and the curtain 12a can function as a lever. Accordingly, in the example embodiment of the shutter system, the transmit springs transmit force from the actuators to the lever. Experimental data has shown that when the actuator force is sufficiently large, the transmit springs begin to curve or buckle, which counter intuitively enhances the flexibility of the transmit spring and increases the rotation (displacement) of the lever (curtain) by continually applying force perpendicular to the lever as it rotates through its arc. Accordingly, it can be the case that increased flexibility in the lever can lead to increased displacement of the curtains, and therefore increased performance of the shutter system of the example embodiment.

Figure 3:
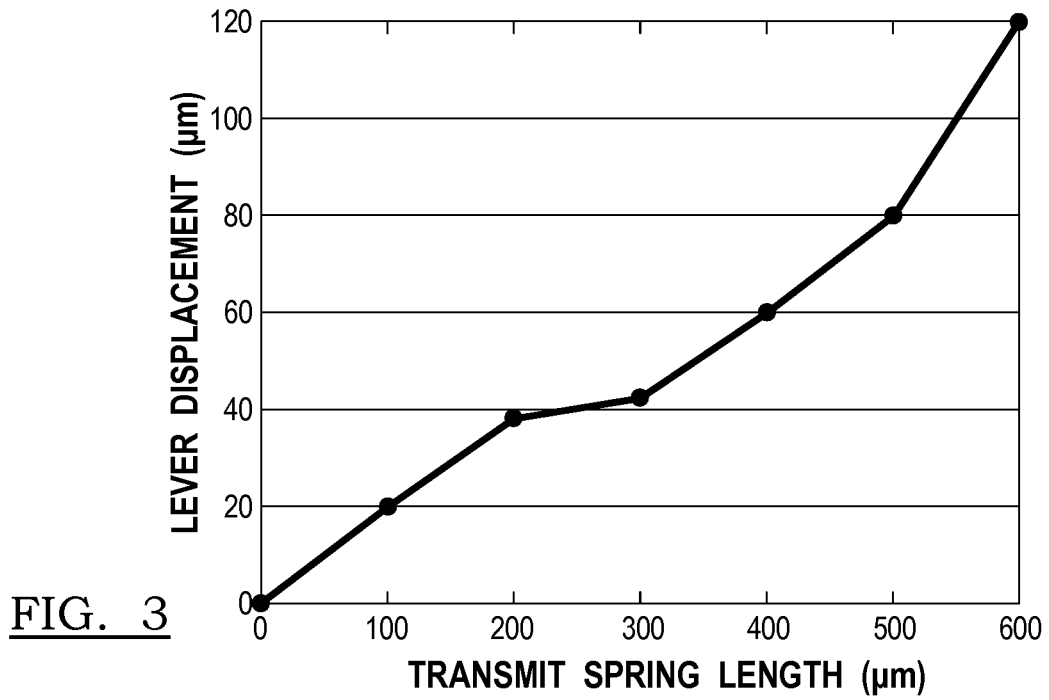
FIG. 3 is a graphical representation of a lever displacement as a function of a transmit spring length in accordance with an example embodiment of the present invention.

FIG. 3 graphically illustrates the correlation between the lever displacement as a function of the length of the transmit spring. As shown therein, as the length of the transmit spring increases, the displacement of the lever increases as well. An example shutter system usable in a mobile terminal camera is limited by packaging and design constraints in maximizing the length of the transmit spring. However, a transmit spring having a length to width ratio of approximately 100:1 can provide consistent flexibility and spring force to the lever. More generally, the length to width ratio of the transmit spring can range between approximately 175:1 and 25:1 depending upon packaging constraints, material selection, actuator size/power, available voltage and the like. The example embodiment of the shutter system included a transmit spring of approximately five hundred micrometers in length and five micrometers in width, with a lever (curtain) of seven hundred fifty micrometers long. The ratio of the lengths of the lever and the transmit spring can range from between 1:3 to 3:1, again depending upon packaging constraints, material selection, actuator size/power, available voltage and the like. As indicated above, in the example embodiment, the ratio of lengths of the lever and the transmit spring is approximately 3:2.

Figure 4:
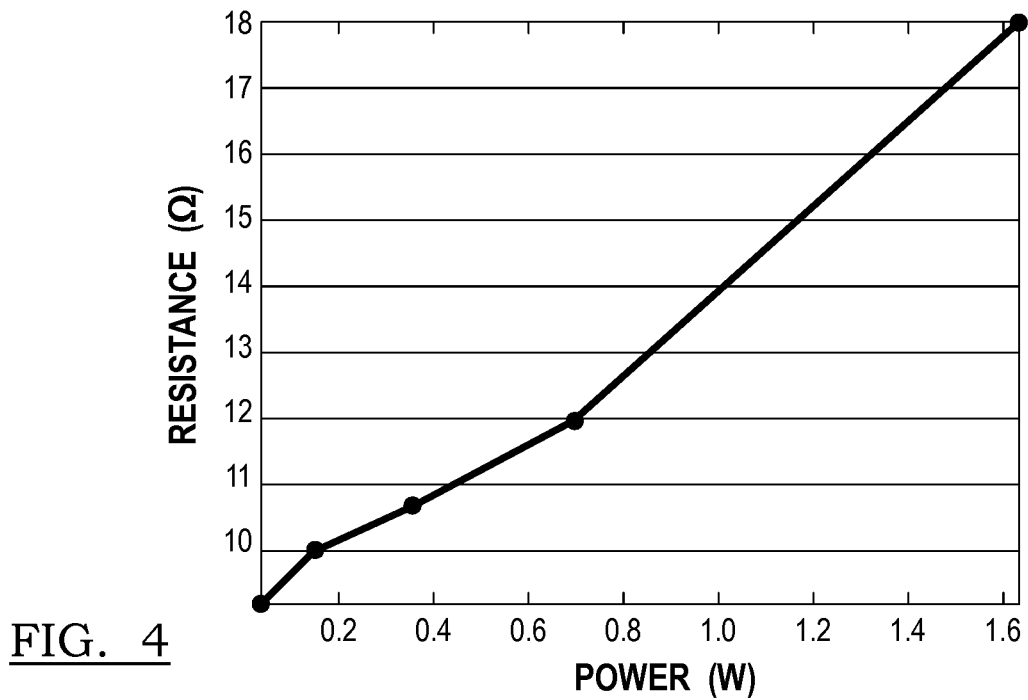
FIG. 4 is a graphical representation of a resistance as a function of power in accordance with the example embodiment of the present invention.

In the example embodiment of the shutter system, the chevron beams of the actuators can have an approximate resistance of ten Ohms, which corresponds to a rho of 0.0025 Ohms-cm. Accordingly, for an applied voltage of approximately five volts, the example embodiment should yield a power consumption of approximately 2.4 Watts per chevron actuator. However, in the example embodiment, the chevron beams are semiconductor-based, and therefore it can be expected that there will be changes in conductance as a function of doping concentrations and temperature. As shown in FIG. 4, there is a correlation between the resistance of the chevron actuators and the power consumption thereof. One of skill in the art will recognize that the correlation between resistance and power consumption as shown in FIG. 4 is specific to the particular design and material selection of the example embodiment. Alternative material selections, semiconductor doping, and the like could readily produce an inverse correlation between resistance and power consumption, or any other possible correlation in response to the chemical and/or physical properties of the materials.

Figure 5:
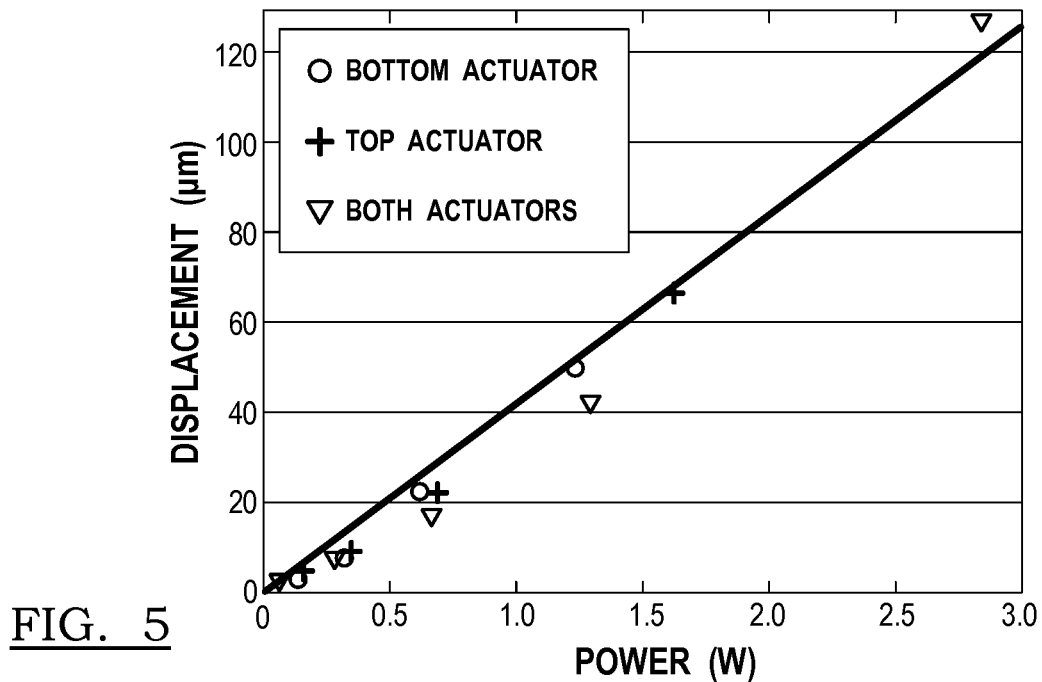
FIG. 5 is a graphical representation of a lever displacement as a function of power in accordance with the example embodiment of the present invention.

The data shown in FIG. 5 illustrates the correlation between the displacement of the actuators as a function of power. As shown therein, for an example embodiment operating at three hundred milliamps with a power level of 2.835 Watts, the displacement of each chevron is approximately six micrometers, which displacement is amplified by the dual force perpendicular lever configuration to yield approximately 127 micrometers of net displacement by the shutters.

Figure 6:
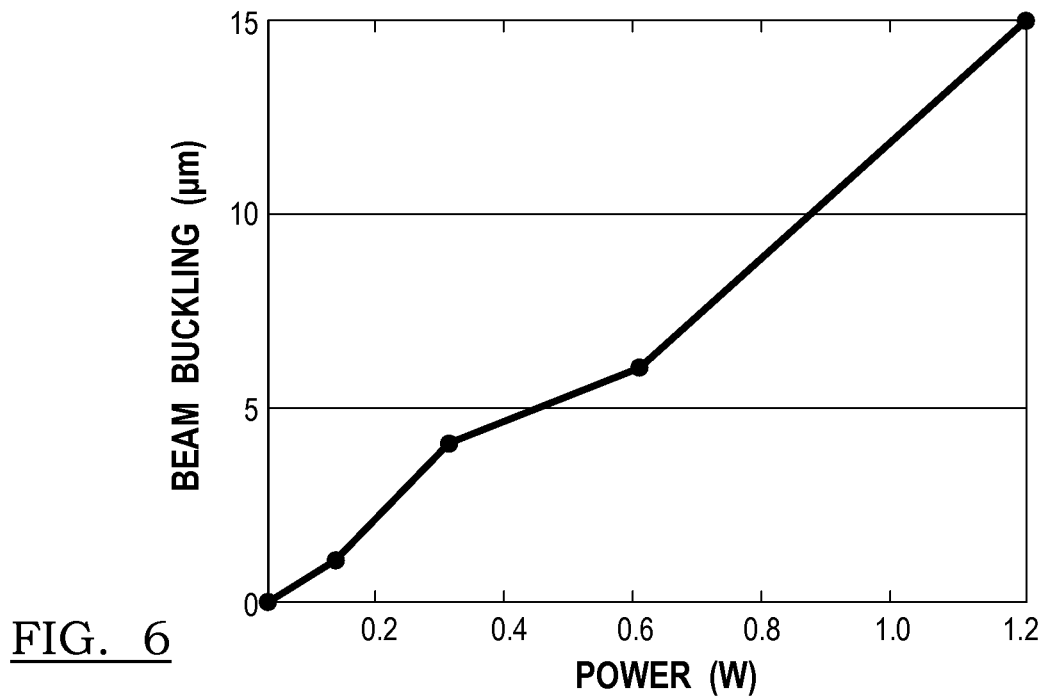
FIG. 6 is a graphical representation of a beam buckling as a function of power in accordance with the example embodiment of the present invention.

As noted above, the transmit springs in the example embodiment undergo some buckling or bending under load from the actuators. FIG. 6 illustrates the relationship between the beam buckling (in micrometers) as a function of power. As indicated above, the curvature of the transmit springs permit a uniform force application to the lever (curtain), resulting in a higher displacement.

Figure 7:
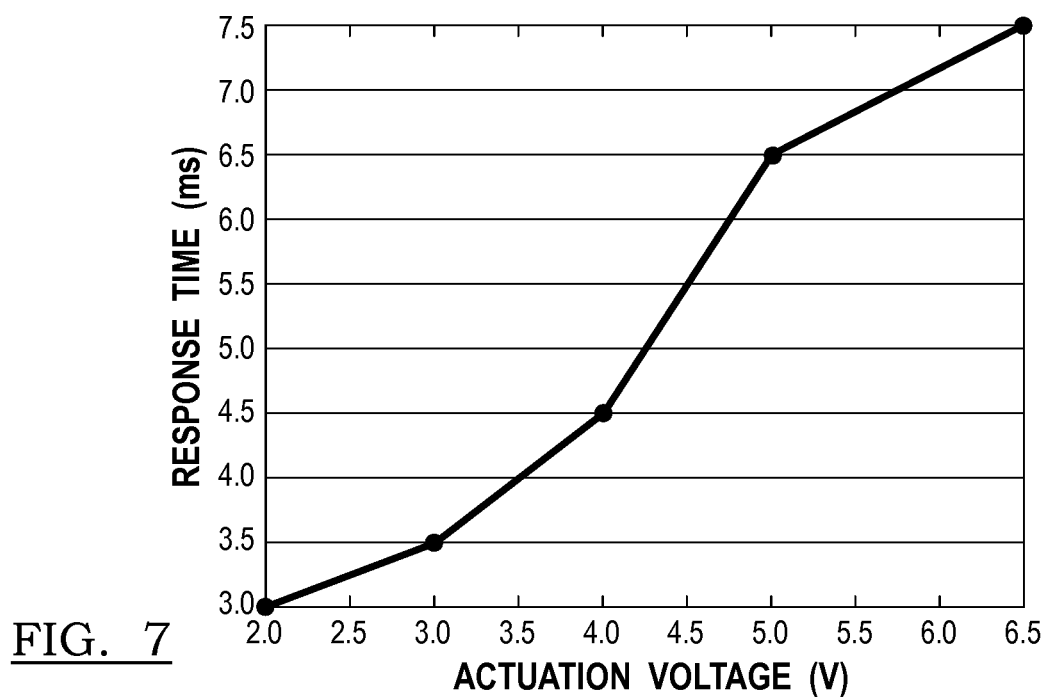
FIG. 7 is a graphical representation of response time as a function of actuation voltage in accordance with the example embodiment of the present invention.

FIG. 7 represents the response time (in milliseconds) of the shutter system of the example embodiment as a function of the actuation voltage. As shown therein, for an actuation voltage of approximately five volts, the response time is approximately 6.5 milliseconds. More generally, in the example embodiment, the actuation voltage can range between approximately 2 and 6.5 volts, corresponding to a response time ranging between approximately 3 and 7.5 milliseconds.

As indicated above with reference to the preferred embodiments and variations thereof, each curtain of the shutter system can be actuated in various manners, including substantially simultaneously, substantially sequentially, or in a staggered or delayed fashion. Accordingly, the effective response time of the shutter system of the example embodiment can be a function of both the response times illustrated in FIG. 7 as well as the manner in which the separate curtains are operated.

The terminology used herein is for the purpose of describing particular embodiments only and is not intended to be limiting of the invention. As used herein, the singular terms "a", "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements and specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The preferred embodiments were chosen and described in order to best explain the principles of the invention and the practical applications, and to enable others of ordinary skill in the art to understand the invention for various embodiments with various modifications as are suited to the particular use contemplated.

What is claimed is:

1. An apparatus comprising:
a curtain substantially disposed in a plane;
an actuator mechanically connected to the curtain; and
a voltage supply electrically connected to the actuator such that in response to a predetermined voltage the actuator thermally expands and thereby causes displacement of the curtain within the plane, wherein the voltage supply is electrically connected to the actuator and the actuator is mechanically connected to the curtain such that the redetermined voltage does not result in a voltage across the curtain.

2. The apparatus of claim 1, wherein the voltage supply is electrically isolated from the curtain.

3. The apparatus of claim 1, wherein the curtain is thermally isolated from the actuator.

4. An apparatus comprising:
a first curtain intersecting an optical path and substantially disposed in a plane;
a second curtain intersecting the optical path and substantially disposed in the plane;
an actuator mechanically connected to the first and second curtains; and
a voltage supply electrically connected to the actuator such that in response to a predetermined voltage the actuator thermally expands and thereby causes displacement of the first and second curtains within the plane.

5. The apparatus of claim 4, wherein the actuator comprises a first actuator and a second actuator, the first actuator being mechanically connected to the first curtain and the second actuator being mechanically connected to the second curtain.

6. The apparatus of claim 5, wherein the first actuator comprises a first MEMS thermal actuator and a second MEMS thermal actuator.

7. The apparatus of claim 6, further comprising a first beam connecting the first MEMS thermal actuator and the first curtain and a second beam connecting the second MEMS thermal actuator and the first curtain.

8. The apparatus of claim 7, wherein the first MEMS thermal actuator is arranged opposite the second MEMS thermal actuator relative to the first curtain such that actuation of the first actuator causes rotational displacement of the first curtain in the plane.

9. The apparatus of claim 8, wherein the first and second MEMS thermal actuators comprise chevron bent beams.

10. The apparatus of claim 9, wherein the second actuator comprises a third MEMS thermal actuator and a fourth MEMS thermal actuator.

11. The apparatus of claim 10, further comprising a third beam connecting the third MEMS thermal actuator and the second curtain and a fourth beam connecting the fourth MEMS thermal actuator and the second curtain.

12. The apparatus of claim 11, wherein the third MEMS thermal actuator is arranged opposite the fourth MEMS thermal actuator relative to the second curtain such that actuation of the second actuator causes rotational displacement of the second curtain in the plane.

13. The apparatus of claim 12, wherein the third and fourth MEMS thermal actuators comprise chevron bent beams.

14. The apparatus of claim 13, further comprising a controller connected to the voltage supply and configured to cause a first voltage to be applied to at least one of the first actuator or the second actuator.

15. The apparatus of claim 14, wherein the controller is configured to cause the first voltage to be applied to the first actuator and a second voltage to be applied to the second actuator substantially simultaneously.

16. The apparatus of claim 15, wherein the first and second voltages are equal.

17. The apparatus of claim 14, wherein the controller is configured to cause the first voltage to be applied to the first actuator and a second voltage to be applied to the second actuator substantially sequentially.

18. The apparatus of claim 14, wherein the controller is configured to cause the first voltage to be applied to the first actuator and a second voltage to be applied to the second actuator in a substantially staggered fashion.

19. The apparatus of claim 14, wherein the controller comprises a mobile terminal camera controller.

20. The apparatus of claim 14, wherein the controller is adapted to cause the first voltage to be applied to the first actuator and a second voltage to be applied to the second actuator at a predetermined frequency.

21. The apparatus of claim 20, wherein the predetermined frequency ranges between 10 Hz and 400 Hz.

22. The apparatus of claim 20, wherein the predetermined frequency is approximately 300 Hz.

23. A shutter apparatus comprising:
a first pair of MEMS thermal actuators mechanically connected to a first curtain intersecting an optical path;
a second pair of MEMS thermal actuators mechanically connected to a second curtain intersecting the optical path; and
a voltage supply electrically connected to the first and second pairs of MEMS thermal actuators such that in response to a predetermined voltage, the first and second pairs of MEMS thermal actuators expand to cause translation of the first and second curtains.

24. The apparatus of claim 23, wherein the first and second pairs of MEMS thermal actuators comprise chevron bent beams.

25. The apparatus of claim 23, wherein the first pair of MEMS thermal actuators are arranged as a dual force perpendicular spring relative to the first curtain.

26. The apparatus of claim 25, wherein the second pair of MEMS thermal actuators are arranged as a dual force perpendicular spring relative to the second curtain.

27. The apparatus of claim 23, further comprising a controller connected to the voltage supply and configured to cause a first voltage to be applied to at least one of the first pair of MEMS thermal actuators or the second pair of MEMS thermal actuators.

28. The apparatus of claim 27, wherein the controller is configured to cause the first voltage to be applied to the first pair of MEMS thermal actuators and a second voltage to be applied to the second pair of MEMS thermal actuators substantially simultaneously.

29. The apparatus of claim 27, wherein the controller is configured to cause the first voltage to be applied to the first pair of MEMS thermal actuators and a second voltage to be applied to the second pair of MEMS thermal actuators substantially sequentially.

30. The apparatus of claim 27, wherein the controller is configured to cause the first voltage to be applied to the first pair of MEMS thermal actuators and a second voltage to be applied to the second pair of MEMS thermal actuators in a substantially staggered fashion.

31. The apparatus of claim 27, wherein the controller comprises a mobile terminal camera controller.

32. The apparatus of claim 27, wherein the controller is adapted to cause the first voltage to be applied to the first actuator and a second voltage to be applied to the second actuator at a predetermined frequency.

33. The apparatus of claim 32, wherein the predetermined frequency ranges between 10 Hz and 400 Hz.

34. The apparatus of claim 32, wherein the predetermined frequency is approximately 300 Hz.

35. An apparatus comprising:
a first dual force perpendicular spring comprising a first pair of MEMS actuators connected to a first curtain;
a second dual force perpendicular spring comprising a second pair of MEMS actuators connected to a second curtain; and
a controller adapted to cause actuation of the first and second dual force perpendicular springs in response to a user input.

36. The apparatus of claim 35, wherein the controller is adapted to direct a predetermined voltage to at least one of the first or second pair of MEMS actuators.

37. The apparatus of claim 35, wherein the first and second curtains are configured to obscure a camera aperture absent the user input.

38. The apparatus of claim 37, wherein the user input comprises a request to take a picture.

39. The apparatus of claim 35, wherein the first and second pair of MEMS actuators comprise one of thermal actuators, electrostatic actuators, magnetic actuators or piezoelectric actuators.

40. The apparatus of claim 35, wherein the first and second pair of MEMS actuators comprise thermal actuators.

41. The apparatus of claim 35, wherein the first and second pair of MEMS actuators comprise electrostatic actuators.

42. The apparatus of claim 35, wherein the first and second pair of MEMS actuators comprise magnetic actuators.

43. The apparatus of claim 35, wherein the first and second pair of MEMS actuators comprise piezoelectric actuators.

* * * * *